R. E. HAMILTON.
POWER INTERRUPTING DEVICE FOR TRACTORS.
APPLICATION FILED NOV. 26, 1915.
1,220,982.
Patented Mar. 27, 1917.
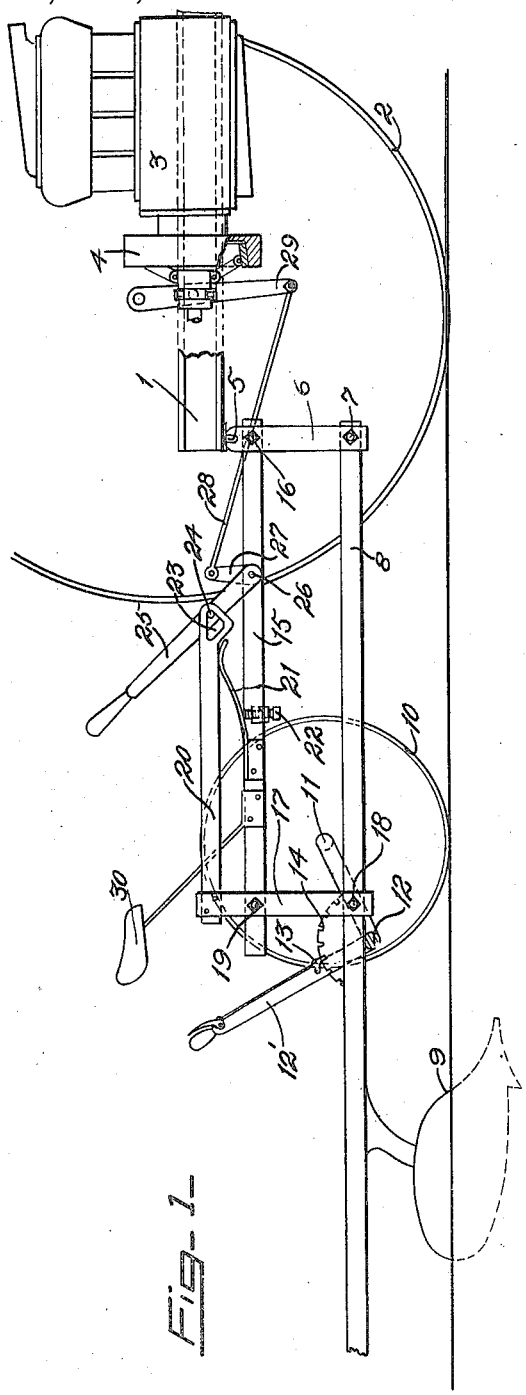
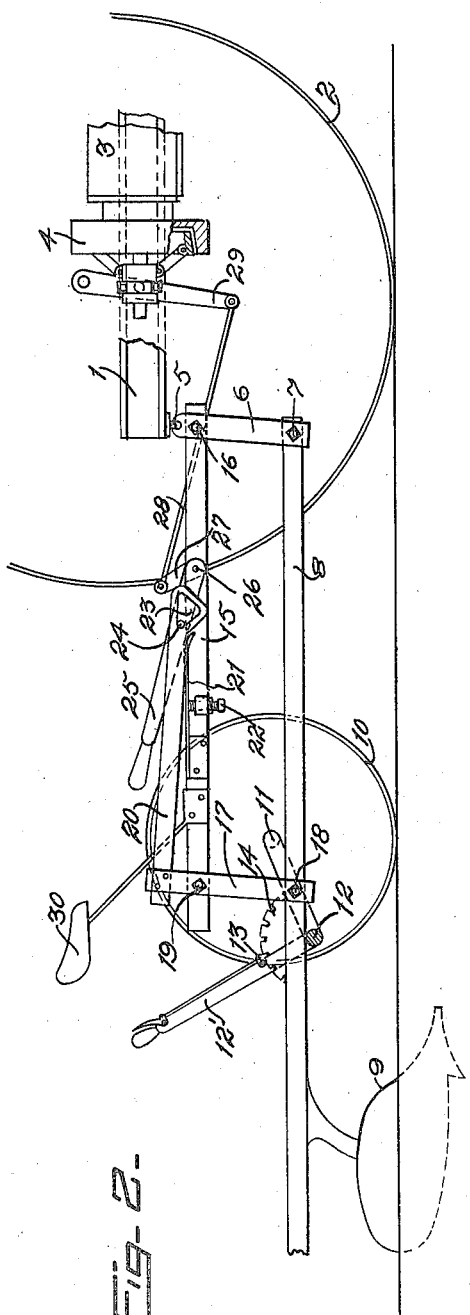
WITNESS
Wm G. Drew
INVENTOR.
Rush E. Hamilton
BY
Acser & Toller
ATTORNEYS.

UNITED STATES PATENT OFFICE.

RUSH E. HAMILTON, OF GEYSERVILLE, CALIFORNIA, ASSIGNOR TO HAMILTON TRACTOR COMPANY, OF SAN FRANCISCO, CALIFORNIA, A CORPORATION OF CALIFORNIA.

POWER-INTERRUPTING DEVICE FOR TRACTORS.

1,220,982.  Specification of Letters Patent.  Patented Mar. 27, 1917.

Application filed November 26, 1915. Serial No. 63,624.

*To all whom it may concern:*

Be it known that I, RUSH E. HAMILTON, a citizen of the United States, residing at Geyserville, in the county of Sonoma and State of California, have invented certain new and useful Improvements in Power-Interrupting Devices for Tractors, of which the following is a specification.

The present invention relates to improvements in attachments for farm implements, such as plows, harrows and cultivators which engage the soil and which are drawn or propelled by mechanical means, whereby on an undue strain being placed on the tool the transmission of power from its source to the propelling wheels will be interrupted or disconnected, thereby stopping the travel of the implement to prevent the traveling of the tool. The principal objects of the present invention are to provide a means whereby the power means for the implement will be automatically disconnected or interrupted on an excess of a predetermined pressure being placed on the tool;
to overcome the breakage of farming implements occasioned by the use of the well known types of tractors which continue to pull the implement when the tool thereof strikes an obstruction; to provide a construction which is simple, may be manufactured at little cost over the regular tractor drawn implements at present used, and the use of which will afford the user a saving in broken implements.
My invention is particularly designed for use in connection with wheeled plows employed in rocky soil or in orchards or like places where it is necessary to operate close to the trees and where the tool thereof is liable to strike a root and become broken.

With the above mentioned and other objects in view, the invention consists in the novel construction and combination of parts hereinafter described, illustrated in the accompanying drawings and set forth in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in side elevation of an embodiment of my invention with the parts in their normal operative position.

Fig. 2 is a view similar to Fig. 1, but with the parts in a position when an undue strain or pressure is applied to the tool, and disclosing the clutch of the operating means disengaged.

Referring more particularly to the several views of the drawings wherein like characters of reference designate corresponding parts,—1 is a suitable tractor frame supported by the wheels 2, the tractor being driven preferably by power generated by the motor 3 and transmitted to the wheels through the clutch 4.

Pivotally suspended from the rear of the frame 1, as at 5, is a supporting member or link 6, to the lower end of which is pivoted, as at 7, the forward end of a plow or implement beam 8 carrying a soil engaging plow or other tool 9, and the depth of engagement of which in the soil is regulated by the adjustable supporting wheels 10 carried on a pivotally mounted substantially U-shaped axle 11. The axle is pivoted to the beam, as at 12, and carries the operating handle 12' provided with the pawl 13 for engaging in the ratchet 14 to maintain the axle in its adjusted position.

A tractor bar 15 is pivotally connected at its forward end, as at 16, to the upper end of the supporting member 6 and extends longitudinally over the plow or implement beam to a point approximately over the pivotal point of the axle 11. A link 17 is pivotally connected to both the plow or implement beam and tractor bar, as at 18 and 19, and carries at its upper end, which projects above the tractor bar, the rear end of an operating lever 20, the free end of which terminates short of the forward end of the tractor bar and is forced upwardly by the spring 21 carried by the tractor bar, and the tension of which is regulated by an adjusting screw 22.

The forward end of the operating lever 20 is provided with a substantially diamond shaped opening 23 in which operates the pin 24 carried by a controlling lever 25, which is pivotally mounted, as at 26, to the tractor bar 15. The controlling lever is provided with an arm 27, which is connected by a link 28 with the lower end of a clutch throw-out yoke 29, of any suitable construction, and which is associated with the movable clutch member. An operator's seat 30 is provided on the tractor bar 15, and the controlling lever 25 and operating handle 12' extend in proximity thereto.

The tractor bar 15, plow or implement beam 8, supporting member 6 and link 17 are pivoted together and form a frame of the shape of a parallelogram, and when the plow or tool carried by the beam 8 is drawn through the soil under ordinary conditions, the frame assumes the position as in Fig. 1. Should the plow or tool 9 strike an obstruction which would exert a pressure thereon greater than the tension of the spring 21, the frame will gradually become distorted, as in Fig. 2, and in so doing the movement of the beam 8 will cause the operating lever 20 to be depressed which will in turn actuate the clutch throw-out yoke 29, which will disconnect the clutch members and interrupt or disconnect the driving power of the tractor. The power will be disconnected or interrupted until such time as the pressure or strain on the tool is relieved.

The tension of the spring is preferably regulated to be depressed when a strain or pressure slightly less than the weakest point of the implement is transmitted thereto, thereby interrupting or disconnecting the source of power to arrest the movement of the tractor before the implement is subjected to a breaking pressure.

Having thus described my invention, what I claim as new and desire to protect by Letters Patent is:—

1. In combination with a tractor, a power means for propelling the same, a wheeled frame for pivotal attachment to the tractor to be drawn thereby, said frame comprising a supporting beam and a tractor bar, means for pivotally connecting said tractor bar and supporting beam at a plurality of points, a member carried by the supporting beam for exerting retarding forces on the beam on the movement of the frame, an operating lever carried by one of said pivotal connecting means and actuated by the movement thereof, tension means for resisting the movement of said operating lever, and a connection extended from said power means and operated by said lever to interrupt the power connection to said tractor on an excess of retardation forces applied to said member carried by the supporting beam over that resisted by said tension means.

2. In combination with a tractor, a power means for propelling the same, a wheeled frame for pivotal attachment to the tractor to be drawn thereby, said frame comprising a supporting beam and a tractor bar, devices for pivotally connecting said tractor bar and supporting beam at a plurality of points, a member carried by the supporting beam for exerting retarding forces on the beam when drawn by said tractor, an operating lever carried by one of said pivotal connecting devices and actuated by the movement thereof, tension means for resisting the movement of said operating lever, means for varying the tension of said tension means, and a connection extended from said power means and operated by said lever to interrupt the power connection to said tractor on an excess of retardation forces applied to said member carried by the supporting beam over that resisted by said tension means.

3. In combination with a tractor, a power means for propelling the same, a wheeled frame comprising pivotally connected side and end members for attachment to the tractor to be drawn thereby, one of the side members providing a supporting beam and the other a tractor bar spaced therefrom, the end frame members providing a means for pivotally connecting said supporting beam and tractor bar at a plurality of points, a member carried by the supporting beam for transmitting retarding forces thereto on the movement of the frame, a connection between the beam and tractor power means whereby on an excess of retardation over a predetermined amount the connection will be automatically actuated to interrupt the transmission of power to the tractor.

4. In combination with a tractor, a power means for propelling the same, a wheeled frame for attachment to the tractor and to be drawn thereby comprising a supporting beam and tractor bar pivotally connected together at a plurality of points, means carried by one of said members for exerting retarding forces on the same on the movement of the frame, an operating means associated with said supporting beam and actuated by the movement thereof, tension means for resisting the movement of said operating means and a connection extended from said power means and operated by said operating means to interrupt the power connection to said tractor on an excess of retarding forces applied to said member carried by the supporting beam over that resisted by said tension means.

5. In combination with a tractor, a wheeled frame for attachment thereto to be drawn thereby and comprising spaced side and end members pivotally connected together, a member carried by one of the frame members for transmitting retarding forces thereto on the movement of said frame by said tractor, yieldable means associated with said frame for resisting the retarding forces and for retaining the frame members in their normal position, and a connection between said frame and the tractor power means whereby on an excess of retardation over a predetermined amount the connection will be actuated to interrupt the transmission of power to the tractor.

6. In combination with a tractor, a power means for propelling the same, a frame for attachment to the tractor and to be drawn thereby and comprising a tractor bar, a member associated therewith for transmitting retarding forces thereto on the movement of the frame by said tractor, an operating lever pivotally mounted within its length to said tractor bar, and its lower end adapted for receiving the retarding forces exerted by said member, means coöperating with said lever for resisting the retarding forces exerted on the same by said member, and a connection between said lever and said tractor power means adapted for operation to interrupt the transmission of power to the tractor on the transmission to said lever of an excess of retardation over a predetermined amount.

7. In combination with a tractor, a power means for propelling the same, a frame for attachment to the tractor and to be drawn thereby and comprising a tractor bar, a member associated therewith for transmitting retarding forces thereto on the movement of the frame by said tractor, an operating lever pivotally mounted within its length to said tractor bar and its lower end adapted for receiving the retarding forces exerted by said member, means for coöperating with said lever for resisting the retarding forces exerted on the same by said member and automatically operated to interrupt the transmission of power to the tractor upon the transmission to said lever of an excess of retardation over a predetermined amount, and a manually operated means for actuating said connection to interrupt the transmission of power to the tractor.

In testimony whereof I have signed my name to this specification in the presence of two subscribing witnesses.

RUSH E. HAMILTON.

Witnesses:
HARRY A. TOTTEN,
D. B. RICHARDS.